(12) United States Patent
Otto et al.

(10) Patent No.: US 6,986,289 B2
(45) Date of Patent: Jan. 17, 2006

(54) TORQUE-DETECTING ARRANGEMENT OR WEAR DETECTING ARRANGEMENT FOR A FRICTION CLUTCH

(75) Inventors: Thomas Otto, Würzburg (DE); Barbara Ester, Schweinfurt (DE)

(73) Assignee: ZF Sachs AG, Schweinfurt (DE)

(*) Notice: Subject to any disclaimer, the term of this patent is extended or adjusted under 35 U.S.C. 154(b) by 0 days.

(21) Appl. No.: 10/458,887

(22) Filed: Jun. 11, 2003

(65) Prior Publication Data

US 2004/0000199 A1    Jan. 1, 2004

(30) Foreign Application Priority Data

Jun. 28, 2002   (DE) ............................... 102 29 084

(51) Int. Cl.
*G01F 1/58* (2006.01)
(52) U.S. Cl. .................................. 73/861.12
(58) Field of Classification Search ............ 73/862.08, 73/862.09, 862.12
See application file for complete search history.

(56) References Cited

U.S. PATENT DOCUMENTS

| 4,474,274 A | * | 10/1984 | Lutz et al. ............... 340/454 |
| 4,513,626 A | * | 4/1985 | Obayashi et al. ...... 73/862.328 |
| 4,683,746 A | | 8/1987 | Cullingford et al. |
| 5,207,092 A | * | 5/1993 | Bruno ....................... 73/118.1 |
| 5,285,691 A | * | 2/1994 | Baer ..................... 73/862.325 |
| 6,259,995 B1 | | 7/2001 | Amberger et al. |
| 2002/0096416 A1 | * | 7/2002 | Otto ....................... 192/85 CA |

FOREIGN PATENT DOCUMENTS

| DE | 197 44 044 | 4/1999 |
| FR | 2 686 975 A | 8/1993 |
| WO | WO 01/96826 A2 | 12/2001 |

* cited by examiner

*Primary Examiner*—Edward Lefkowitz
*Assistant Examiner*—Takisha Miller
(74) *Attorney, Agent, or Firm*—Cohen, Pontani, Lieberman & Pavane

(57) ABSTRACT

Apparatus for detecting a parameter associated with the torque transmitted by a friction clutch, where the friction clutch has a clutch disk which is or can be connected for rotation in common to a power takeoff shaft. The apparatus includes a receiver area, which does not rotate with the clutch disk in the torque-transmitting state, and a code provided on the clutch disk. The code can be scanned by the receiver area and thus generates a sensor signal associated with transmitted torque.

16 Claims, 2 Drawing Sheets

TORQUE-DETECTING ARRANGEMENT OR WEAR DETECTING ARRANGEMENT FOR A FRICTION CLUTCH

BACKGROUND OF THE INVENTION

1. Field of the Invention

The present invention pertains in general to friction clutches and to torque-detecting arrangements and wear-detecting arrangements provided for such clutches.

2. Description of the Related Art

Modern drive systems frequently make use of friction clutches, which are no longer operated directly by mechanical means by the driver, but rather by an actuator. So that the clutch-engaging and clutch-disengaging operations can be carried out properly, it is necessary for various parameters which characterize the operating state of this type of friction clutch to be known. Thus, for example, it is necessary especially for the sake of synchronization with the shifting operations which take place in the transmission system to know the exact degree to which the clutch is engaged or disengaged at the moment in question. This is usually done by measuring the release distance, and on the basis of the release distance, a conclusion can ultimately be drawn concerning the amount of torque being transmitted via the clutch. Because in this case a chain of mechanically interacting components is involved, all of which have manufacturing tolerances and all of which can have a certain amount of play with respect to each other, this type of detection method suffers from a comparatively high degree of uncertainty, as a result of which it is difficult to determine the exact extent to which the clutch is engaged or disengaged at a specific moment. Here, too, the state of wear, such as the degree to which the friction linings present in a friction clutch have been worn down, also exerts a considerable influence on the engaging and disengaging characteristic. When wear of this kind occurs, a stored-energy device present in the clutch usually also changes its installation position and thus its force characteristic as well, which means that the time it takes for the various engaging and disengaging operations to occur can also change unless appropriate adjustments are made to the control measures for the actuator.

A system is also known from the U.S. published Application No. 2002/096,416, in which, to detect the torque being transmitted by a friction clutch, a sensor is used to scan a code provided on the transmission input shaft. This code is formed by the appropriate magnetization of the shaft, and a sensor signal is generated by the twisting of the shaft which occurs during the torque-transmitting process and by the associated change in the area of the code. This signal is ultimately related to the torque transmitted by the clutch and can be used to ensure that the actuator actuates the clutch properly.

SUMMARY OF THE INVENTION

It is the task of the present invention to provide a torque-transmitting arrangement and/or a wear-detecting arrangement for a friction clutch and/or to provide a friction clutch containing these types of arrangements, by means of which it is possible to determine the torque transmitted by a friction clutch and/or to determine the state of wear of the friction clutch in a simple and reliable manner.

According to a first aspect, this task is accomplished by a torque-detecting arrangement for detecting a parameter associated with the torque transmitted by the friction clutch, where the friction clutch has a clutch disk, which is or can be connected to a power takeoff shaft for rotation in common, the arrangement comprising a receiver area, which does not rotate with the clutch disk in the torque-transmitting state, and a code, which is provided on the clutch disk, can be scanned by the receiver area, and generates a sensor signal associated with the transmitted torque.

An essential aspect of the present invention is that the transmitted torque or a parameter associated with it, such as the twisting of a component situated in the path of torque transmission, is no longer sensed on the basis of the power takeoff shaft but rather on the basis of an area of the clutch disk. This simplifies the process of producing the code, because it is no longer necessary to machine the power takeoff shaft, which is a relatively large component, or to produce it out of a special material. Instead, the only the comparatively easy-to-handle clutch disk must be so machined or made.

It is possible, for example, for the code to be provided on the axially projecting hub area of the clutch disk provided for connection to the power takeoff shaft for rotation in common, and for the receiver area to be provided radially outside this hub area.

So that the receiver area can be positioned easily where it can effectively scan the code, the receiver area can be provided on a stationary component of a clutch-release mechanism.

The code and the receiver area can work together in a manner which is especially insensitive to external influences by designing the code in the form of at least local magnetizations of an area of the clutch disk situated opposite the receiver area. Any dirt or deposits which may accumulate have no negative effect on the detection accuracy in this type of design.

According to a second aspect, the task described above is accomplished by a wear-detecting arrangement for detecting a parameter associated with the wear which occurs in a friction clutch, where the friction clutch has a clutch disk, which is or can be connected nonrotatably to a power takeoff shaft but is or can be connected to this shaft in a manner which allows axial movement, the arrangement comprising a receiver area, which is essentially unable to move in the axial direction, and a signal-transmitting or code area, which is provided on the clutch disk, which generates a sensor signal associated with an axial position and/or an axial displacement of the clutch disk and can be scanned by the receiver area.

According to this aspect, advantage is taken of the fact that, in a defined operating state, such as in the engaged state of the clutch, the axial position which the clutch disk occupies after wear has occurred, such as wear in the area of the friction linings, is different from that which it occupies before any wear has occurred. This change in the axial position can be detected. Here, too, it is a significant advantage that there are no sources of error of any kind between the component which has actually undergone the displacement and the scanned component itself, such sources including, for example, manufacturing tolerances and play, which could falsify the signal representing the amount of wear which has occurred.

The wear-detecting process can again be made especially insensitive to external influences by designing the signal-generating area in the form of a permanently magnetic area of material on the clutch disk. In addition, a design which is preferred for manufacturing reasons provides that the signal-generating area is present on an axially projecting hub area of the clutch disk designed to be connected for rotation in common to the power takeoff shaft, and that the receiver area is provided radially outside this hub area.

The present invention also pertains to a friction clutch with a torque-detecting arrangement according to the invention and/or a wear-detecting arrangement according to the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
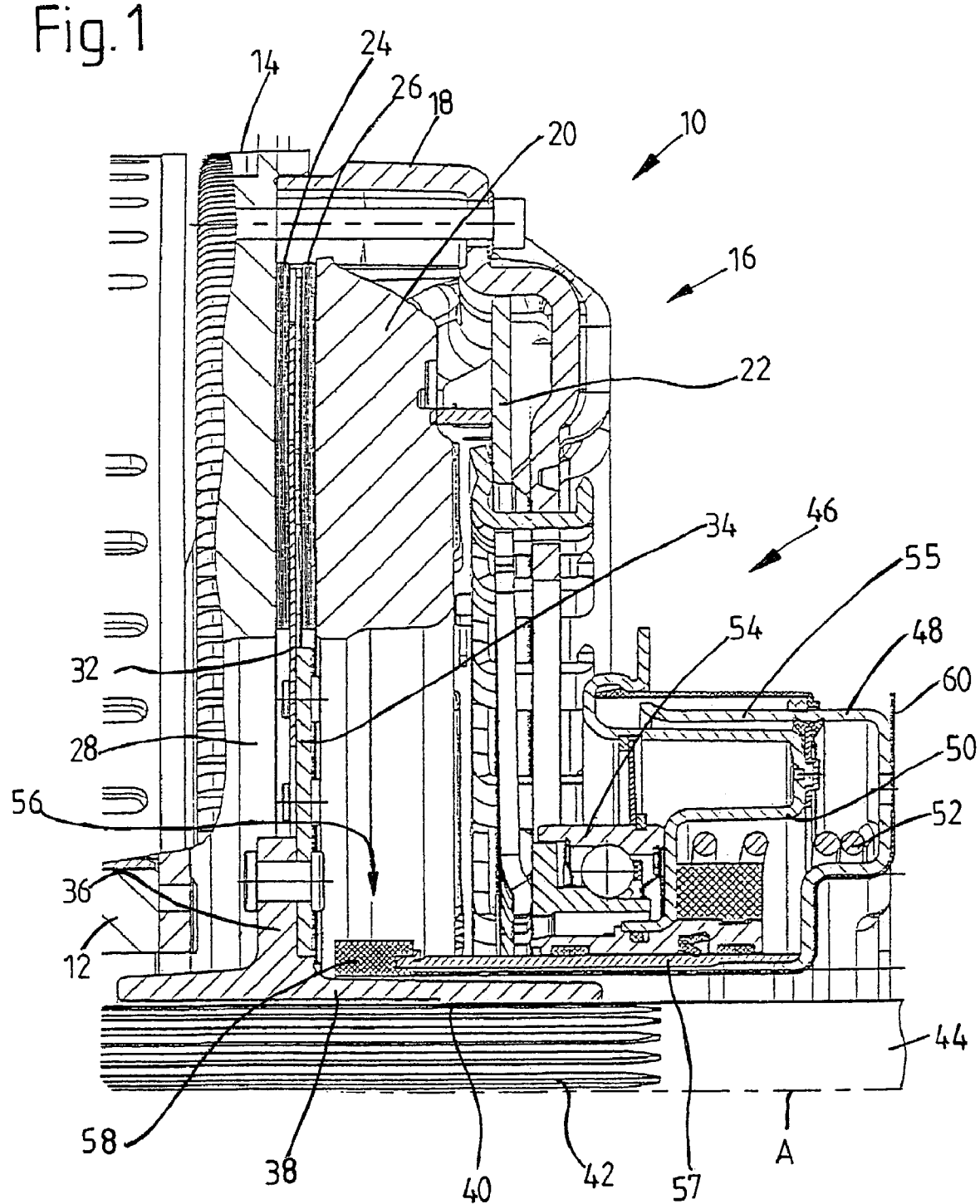
FIG. 1 shows a partial longitudinal section through a friction clutch embodying the principles of the invention.

The friction clutch 10 shown in FIG. 1 comprises in general a flywheel 14, which is or can be connected to a drive shaft 12 for rotation in common, and a pressure plate assembly 16, connected nonrotatably in the radially outer area to the flywheel 14. This assembly has a housing 18, in which a pressure plate 20 is mounted by means of tangential leaf springs or the like so that it can move in the axial direction, but is essentially torsion-proof. A stored-energy device, such as a device in the form of a diaphragm spring 22, acts on the pressure plate 20, pushing it toward the flywheel 14, so that, when the clutch 10 is engaged, the friction linings 24, 26 of a clutch disk 28 are clamped between the associated friction surfaces of the flywheel 14 and of the pressure plate 20. The clutch disk 28 can be of conventional design and have a lining support area 32 provided with, for example, a resilient-cover. This support area can be riveted to a ring-shaped disk part 34, this part 34 being riveted in turn to a radial flange 36 of a hub area 38, which has approximately the shape of a cylinder and which extends in the same direction as an axis of rotation A. Of course, the part 34 can also be designed to be integral with the radial flange 36. In addition, it is obvious that the clutch disk 28 of the conventional design can have a torsional vibration damping area.

In its inner circumferential area, the hub area 38 has a set of teeth 40 extending in the same direction as the axis A, which teeth engage with a corresponding set of teeth 42 on a power takeoff shaft 44, such as a transmission input shaft, so that the clutch disk 28 cannot rotate with respect to the shaft but can shift in the axial direction.

A clutch-release mechanism 46 has a ring-shaped release cylinder 48, which can be held in place on a transmission housing wall, etc., in which cylinder a corresponding ring-shaped release piston 50 is provided in a fluid-tight manner. The release piston 50 together with a release bearing 54 mounted on it is pretensioned by a pretensioning spring 52 so that it rests firmly against the radially inner area of the stored-energy device 22. The release piston 50 is sealed off in a fluid-tight manner by appropriate seal arrangements both against a radially outer cylindrical section 55 of the release cylinder 48 and also against a radially inner cylindrical section 57. The release piston 50 is pushed out from the release cylinder 48 by the introduction of a hydraulic fluid such as compressed air or a pressurized liquid, so that, in the example of a clutch of the push-type shown here, the diaphragm spring 22 at least partially releases the force it is exerting on the pressure plate 20, and thus the clutch is able to disengage.

The friction clutch 10 also has a torque-sensing arrangement 56. This comprises a receiver area 58 which, in the example shown here, is attached to the radially inner cylindrical section 57 of the release cylinder 48 by means of, for example, a latching type of connection, by an adhesive bond, etc. The receiver area 58 has the shape of a ring and essentially completely surrounds the cylindrical hub area 38, which extends in the axial direction. On the section of the hub area 38 covered axially by the receiver area 58, the hub carries a code formed by permanent magnetization. This code can be scanned by two coils, for example, which are provided inside the receiver area 58 a certain axial distance apart. A twisting of the hub area 38 caused by the transmission of torque leads to a corresponding deformation and/or movement of the code, so that different signals or temporally offset signals are generated in the two axially separated coils. These signals make it possible to determine the torque transmitted by this clutch disk 28. Sensor arrangements which can detect codes formed on components by magnetization are sold by the company FAST Technology AG of Munich, for example.

An essential advantage of the arrangement according to the invention is that the code, that is, the permanent magnetization, is provided on a component which is comparatively easy to produce and to handle, namely, the hub area 38 of the clutch disk 28. This comparatively small component can be easily subjected to local permanent magnetization in an appropriate device and thus makes it easy to detect a parameter directly associated with the transmitted torque.

The receiver area 58 can be connected by a cable 60 to a control unit, which evaluates the corresponding signals, as shown in FIG. 1, but the signals can also be transmitted in wireless fashion. Although obvious, it should be pointed out that, in the case of clutch-release mechanisms with a different design, the receiver area 58 can be positioned or mounted elsewhere so that it doesn't rotate during rotational operation. In particular, in cases where the clutch is actuated by a disconnect fork, the receiver area can be supported on the guide tube of the release mechanism itself.

In the case of the embodiment shown in FIG. 1, it is also possible to provide the code not on an axially projecting area, but rather on a flange-like, radially oriented area and to scan this area with a receiver area which also projects in the radial direction. The radial area is also distorted in the circumferential direction when torque is transmitted via the clutch disk. This distortion can be detected and used to generate a signal corresponding to the amount of torque transmitted.

As an alternative or in addition to the detection of the transmitted torque by means of the receiver area 58 and the code assigned to it, such as a permanent magnetic code, it is also possible on the basis of the embodiment described above and illustrated in FIG. 1 to obtain information concerning the amount of wear which has occurred. When the code shifts axially with respect to the receiver area 58, this can lead, for example, to a change in the amount of overlap between the code and the associated detection coils. Such a change can be detected on the basis of, for example, a change in the amplitude of the signal. This type of change is associated with the loss of material by abrasion from the friction linings 24, 26, which causes a change in the axial position of the clutch disk 28. It is therefore possible to obtain information in this way concerning the current state of wear.

Figure 2:
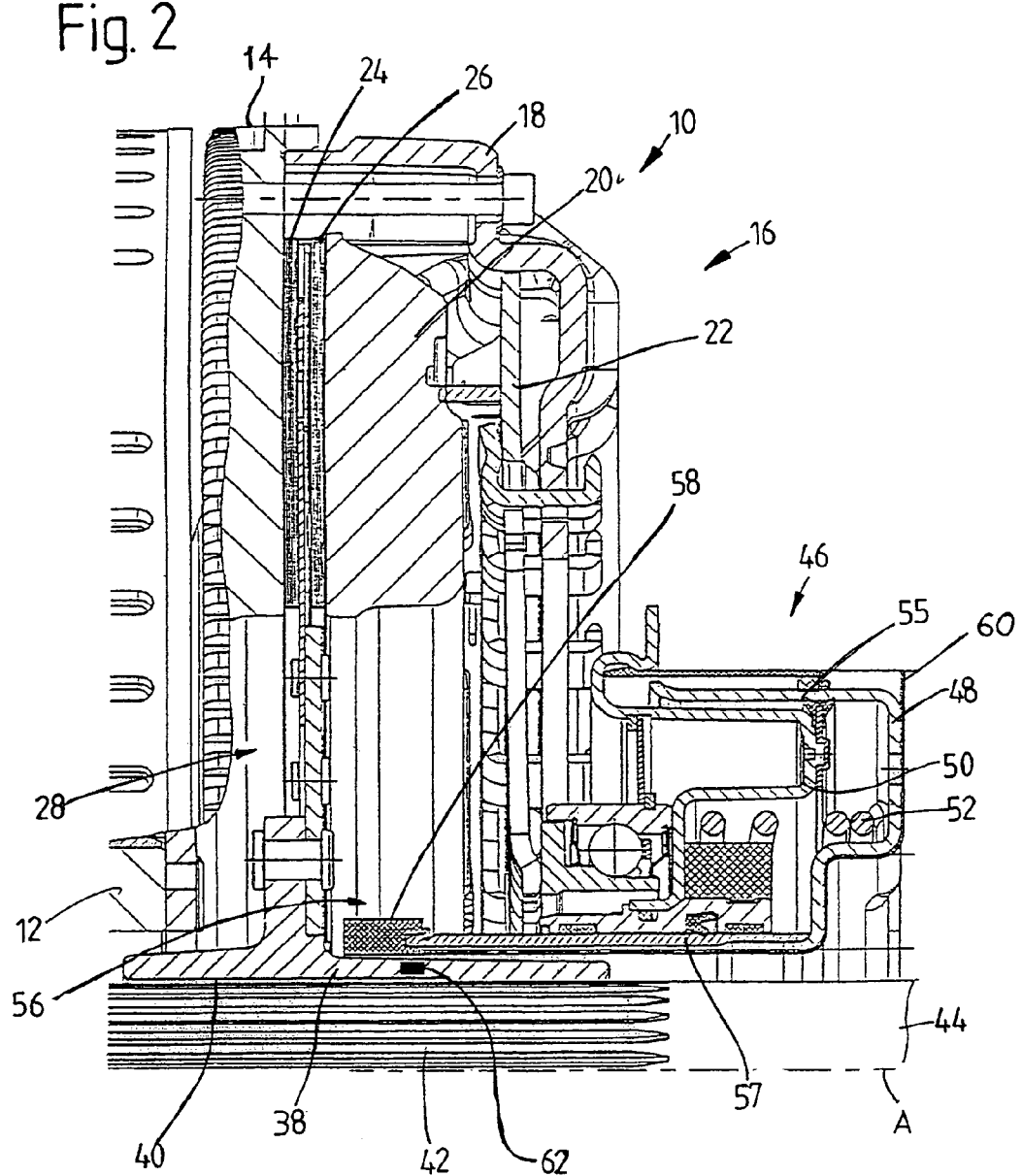
FIG. 2 shows a modified embodiment of the friction clutch illustrated in FIG. 1.

In the case of the variant shown in FIG. 2, the basic design of which is similar to that of the arrangement described above and according to which the torque transmitted by the clutch disk 28 is detected, the option of detecting the axial position or axial displacement of the clutch disk 28 is also offered. For this purpose, a permanently magnetic signal-generating area 62 is present on the hub area 38 of the clutch disk 28. This can be a permanent magnet installed in the hub area, but it can also be an area of material of the hub area 38 formed by an appropriate encoding or magnetization process. In the receiver area 58, a corresponding arrangement, such as, once again, a magnetic coil, is provided, for example, to detect the axial position of the signal-generating area 62 by induction. This axial position corresponds to the axial position of the entire clutch disk, which changes as material is abraded from the friction linings 24, 26. It is therefore possible to obtain wear-related information directly from the component which shifts position as a result of wear, namely, the clutch disk 28, which information can then be used in an appropriate manner, such as for the purpose of changing the way in which an actuator is controlled. It is an essential advantage here that the wear is not detected indirectly via the intermediate action of mechanically interacting components, all of which can have manufacturing tolerances and free play with respect to each other and which thus allow only a comparatively imprecise detection of the wear. Because the design according to the invention detects the wear which has occurred very accurately, it is possible to reduce the minimum safety allowance for the wear-affected friction linings without leading to any danger of damage to any of the components. The period of time over which a single clutch disk 28 may be used can therefore be extended. Once the maximum allowable wear has occurred, an appropriate warning signal can be generated, which indicates that the clutch disk must now be replaced.

The sensing method in the area of the clutch disk according to the invention therefore makes it possible, in the case of a friction clutch, to obtain relevant information directly, that is, without danger of falsification of the desired information, so that control measures or safety measures can be implemented with greater precision or at more suitable points in time.

The invention is not limited by the embodiments described above which are presented as examples only but can be modified in various ways within the scope of protection defined by the appended patent claims.

We claim:

1. An apparatus for detecting torque transmitted by a friction clutch, said apparatus comprising:
   a clutch disk which can be connected to a power take-off shaft for rotation in common with said shaft;
   a code arranged on the clutch disk; and
   a receiver area which does not rotate with said clutch disk in a torque-transmitting state, said receiver area being arranged to scan said code and generate a signal associated with the torque transmitted.

2. An apparatus as in claim 1 wherein said clutch disk comprises a hub area which projects axially and is designed to be connected to said power take-off shaft for rotation in common, said code being arranged on said hub area, said receiver area being arranged radially outside of said hub area.

3. An apparatus as in claim 1 further comprising a clutch release mechanism having a stationary component, said receiver area being arranged on said stationary component.

4. An apparatus as in 3 wherein the clutch release mechanism comprises a piston and a cylinder, said cylinder comprising said stationary component.

5. An apparatus as in claim 1 wherein said code is formed by local magnetization of said clutch disk opposite the receiver area.

6. An apparatus for detecting wear which occurs in a friction clutch, said apparatus comprising:
   a clutch disk which can be connected to a power take-off shaft for rotation in common with said shaft while being axially movable with respect to said shaft;
   a code arranged on the clutch disk; and
   a receiver area which does not rotate with said clutch disk in a torque-transmitting state, said receiver being arranged to scan said code and generate a signal associated with at least one of the axial position and the axial displacement of the clutch disk.

7. An apparatus as in claim 6 wherein said code is formed by local magnetization of said clutch disk opposite the receiver area.

8. An apparatus as in claim 6 wherein said clutch disk comprises a hub area which projects axially and is designed to be connected to said power take-off shaft for rotation in common, said code being arranged on said hub area, said receiver area being arranged radially outside of said hub area.

9. An friction clutch comprising:
   a clutch disk which can be connected to a power take-off shaft for rotation in common with said shaft;
   a code arranged on the clutch disk; and
   a receiver area which does not rotate with said clutch disk in a torque-transmitting state, said receiver being arranged to scan said code and generate a signal associated with the torque transmitted.

10. A friction clutch as in claim 9 wherein said clutch disk comprises a hub area which projects axially and is designed to be connected to said power take-off shaft for rotation in common, said code being arranged on said hub area, said receiver area being arranged radially outside of said hub area.

11. A friction clutch as in claim 9 further comprising a clutch release mechanism having a stationary component, said receiver area being arranged on said stationary component.

12. A friction clutch as in claim 11 wherein clutch release mechanism comprises a piston and a cylinder, said cylinder comprising said stationary component.

13. A friction clutch as in claim 9 wherein said code is formed by local magnetization of said clutch disk opposite the receiver area.

14. A friction clutch comprising:
   a clutch disk which can be connected to a power take-off shaft for rotation in common with said shaft while being axially movable with respect to said shaft;
   a code arranged on the clutch disk; and
   a receiver area which does not rotate with said clutch disk in a torque-transmitting state, said receiver area being arranged to scan said code and generate a signal associated with at least one of the axial position and the axial displacement of the clutch disk.

15. A friction clutch as in claim 14 wherein said code is formed by local magnetization of said clutch disk opposite the receiver area.

16. A friction clutch as in claim 14 wherein said clutch disk comprises a hub area which projects axially and is designed to be connected to said power take-off shaft for rotation in common, said code being arranged on said hub area, said receiver area being arranged radially outside of said hub area.

* * * * *